(12) United States Patent
Lee et al.

(10) Patent No.: US 11,468,267 B2
(45) Date of Patent: Oct. 11, 2022

(54) APPARATUS AND METHOD FOR CLASSIFYING IMAGE

(71) Applicant: SAMSUNG SDS CO., LTD., Seoul (KR)

(72) Inventors: JoonHo Lee, Seoul (KR); HyoSeob Song, Seoul (KR); JiEun Song, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 326 days.

(21) Appl. No.: 16/662,424

(22) Filed: Oct. 24, 2019

(65) Prior Publication Data
US 2020/0134386 A1    Apr. 30, 2020

(30) Foreign Application Priority Data

Oct. 24, 2018  (KR) .......... 10-2018-0127705

(51) Int. Cl.
| | |
|---|---|
| *G06K 9/62* | (2022.01) |
| *G06F 16/51* | (2019.01) |
| *G06N 5/04* | (2006.01) |
| *G06N 20/00* | (2019.01) |
| *G06V 10/40* | (2022.01) |
| *G06N 3/04* | (2006.01) |

(52) U.S. Cl.
CPC ........... *G06K 9/6262* (2013.01); *G06F 16/51* (2019.01); *G06K 9/623* (2013.01); *G06K 9/628* (2013.01); *G06N 3/0454* (2013.01); *G06N 5/04* (2013.01); *G06N 20/00* (2019.01); *G06V 10/40* (2022.01)

(58) Field of Classification Search
CPC ........ G06K 9/6262; G06K 9/46; G06K 9/623; G06K 9/628; G06K 9/6227; G06K 9/6257; G06K 9/00718; G06F 16/51; G06N 5/04; G06N 20/00; G06N 3/08; G06N 5/003; G06N 20/20; G06N 3/0454
See application file for complete search history.

(56) References Cited

U.S. PATENT DOCUMENTS

2006/0018521 A1*  1/2006  Avidan ................. G06K 9/4609
                                                   382/118

OTHER PUBLICATIONS

Guo, J., Zhou, H. and Zhu, C., 2013. Cascaded classification of high resolution remote sensing images using multiple contexts. Information Sciences, 221, pp. 84-97.*

(Continued)

*Primary Examiner* — Zhitong Chen
(74) *Attorney, Agent, or Firm* — The PL Law Group, PLLC

(57) ABSTRACT

An image classification apparatus includes an image segmentation module configured to segment a learning image into a plurality of segment images, a primary classification module configured to perform machine learning on a primary classifier using the plurality of segment images, and a secondary classification module configured to calculate a weight value combination for creating a secondary classification estimation value for the learning image from a plurality of primary classification estimation values generated by passing the plurality of segment images to the trained primary classifier, or a machine learning-based learning parameter.

16 Claims, 6 Drawing Sheets

(56) References Cited

OTHER PUBLICATIONS

Nagi, J., Di Caro, G.A., Giusti, A., Nagi, F. and Gambardella, L.M., Dec. 2012. Convolutional neural support vector machines: hybrid visual pattern classifiers for multi-robot systems. In 2012 11th International Conference on Machine Learning and Applications (vol. 1, pp. 27-32). IEEE.*

Suykens, J.A. and Vandewalle, J., 1999. Training multilayer perceptron classifiers based on a modified support vector method. IEEE transactions on Neural Networks, 10(4), pp. 907-911.*

* cited by examiner

APPARATUS AND METHOD FOR CLASSIFYING IMAGE

CROSS-REFERENCE TO RELATED APPLICATION

This application claims priority to and the benefit of Korean Patent Application No. 10-2018-0127705, filed on Oct. 24, 2018, the disclosure of which is incorporated herein by reference in its entirety.

BACKGROUND

1. Field

The disclosed embodiments relate to a technique of classifying high-resolution images.

2. Discussion of Related Art

Image classification is a technique of analyzing an image and determining a class that the image belongs to. For example, in the case of a medical image of a patient, whether a specific disease exists may be determined through the image classification. Recently, the cases of using an algorithm of machine learning or deep learning for image classification are increasing.

In the case of image classification algorithms based on machine learning or deep learning, it is very difficult to use high-resolution images as they are due to performance constraints. Accordingly, a method of dividing an original image into a plurality of small segments and learning the segments is used. However, in the image classification method using segment images, there are mutually contradictory situations which reduce the accuracy of classification results, for example, there are cases in which the entire original image is classified according to important features although the features are found only in a small number of segments or there are cases in which classification of the entire image is determined by the number of features of the image, not by the existence of the features.

SUMMARY

The disclosed embodiments are for providing a technical means for enhancing accuracy of an image classification technique based on machine learning using image segmentation.

According to an exemplary embodiment, there is provided an image classification apparatus comprising: an image segmentation module for segmenting a learning image into a plurality of segment images; a primary classification module configured to perform machine learning on a primary classifier using the plurality of segment images; and a secondary classification module configured to calculate a weight value combination for creating a secondary classification estimation value for the learning image from a plurality of primary classification estimation values generated by passing the plurality of segment images to the trained primary classifier, or a machine learning-based learning parameter.

The primary classification module may be further configured to perform machine learning on the primary classifier by individually inputting the plurality of segment images into the primary classifier.

A classification value of each of the plurality of segment images inputted into the primary classifier may be set to be equal to a classification value of the learning image.

The primary classification estimation value may be any one among a regression value, a score value and a class value of each classification target class.

The secondary classification module may be further configured to receive an initial weight value and a weight value search range for each of the plurality of primary classification estimation values, and search for an optimum weight value combination satisfying a preset condition while changing the initial weight value within the inputted weight value search range.

If a loss is smaller than a preset threshold value when a specific weight value combination is applied to the plurality of primary classification estimation values, the secondary classification module may be further configured to determine the specific weight value combination as the optimum weight value combination.

The secondary classification module may be further configured to perform machine learning on a secondary classifier by simultaneously inputting the plurality of primary classification estimation values into the secondary classifier.

The secondary classification module may be further configured to update a learning parameter of the secondary classifier so that a loss of the secondary classification estimation value generated by the trained secondary classifier may be smaller than a preset threshold value.

According to another exemplary embodiment, there is provided an image classification method performed in a computing device including one or more processors and a memory for storing one or more programs executed by the one or more processors, the method comprising: a step of segmenting a learning image into a plurality of segment images; a primary learning step of performing machine learning on a primary classifier using the plurality of segment images; and a secondary learning step of calculating a weight value combination for creating a secondary classification estimation value for the learning image from a plurality of primary classification estimation values generated by passing the plurality of segment images to the trained primary classifier, or a machine learning-based learning parameter.

The primary learning step may comprise performing machine learning on the primary classifier by individually inputting the plurality of segment images into the primary classifier.

A classification value of each of the plurality of segment images inputted into the primary classifier may be set to be equal to a classification value of the learning image.

The primary classification estimation value may be any one among a regression value, a score value and a class value of each classification target class.

The secondary learning step may comprise: receiving an initial weight value and a weight value search range for each of the plurality of primary classification estimation values; and searching for an optimum weight value combination satisfying a preset condition while changing the initial weight value within the inputted weight value search range.

If a loss is smaller than a preset threshold value when a specific weight value combination is applied to the plurality of primary classification estimation values, the secondary learning step may further comprise determining the specific weight value combination as the optimum weight value combination.

The secondary learning step may comprise performing machine learning on a secondary classifier by simultaneously inputting the plurality of primary classification estimation values into the secondary classifier.

The secondary learning step may further comprise updating a learning parameter of the secondary classifier so that a loss of the secondary classification estimation value generated by the trained secondary classifier may be smaller than a preset threshold value.

DETAILED DESCRIPTION

Hereafter, exemplary embodiments of the present disclosure will be described with reference to the accompanying drawings. The detailed description is provided below to help comprehensive understanding of the methods, apparatuses and/or systems described in this specification. However, these are only an example, and the present disclosure is not limited thereto.

In describing the embodiments of the present disclosure, when it is determined that specific description of known techniques related to the present disclosure unnecessarily blur the gist of the present disclosure, the detailed description will be omitted. In addition, the terms described below are terms defined considering the functions of the present disclosure, and these may vary according to user, operator's intention, custom or the like. Therefore, definitions thereof should be determined on the basis of the full text of the specification. The terms used in the detailed description are only for describing the embodiments of the present disclosure and should not be restrictive. Unless clearly used otherwise, expressions of singular forms include meanings of plural forms. In the description, expressions such as "include", "provide" and the like are for indicating certain features, numerals, steps, operations, components, some of these, or a combination thereof, and they should not be interpreted to preclude the presence or possibility of one or more other features, numerals, steps, operations, components, some of these, or a combination thereof, other than those described above.

Figure 1:
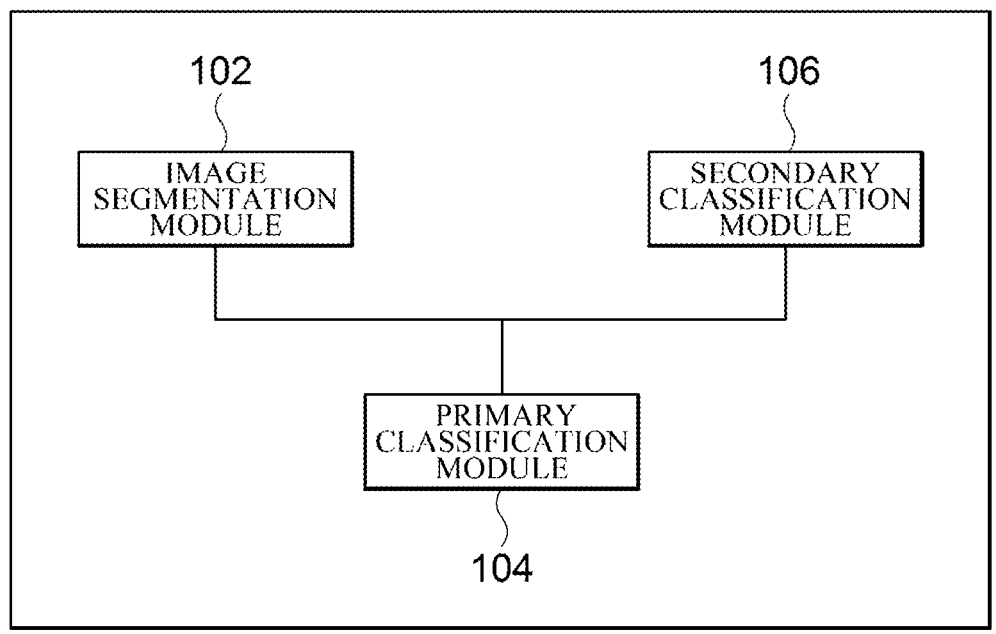
FIG. 1 is a block diagram showing an image classification apparatus 100 according to an embodiment.

FIG. 1 is a block diagram showing an image classification apparatus 100 according to an embodiment. As shown in the figure, the image classification apparatus 100 according to an embodiment includes an image segmentation module 102, a primary classification module 104, and a secondary classification module 106.

The image segmentation module 102 segments an inputted original learning image into a plurality of segment images. In the disclosed embodiments, the image segmentation module 102 may segment the original image into a plurality of segment images in various methods. According to embodiments, the segmented images may have various sizes, and there may be areas where the images are overlapped with each other. That is, it should be noted that the disclosed embodiments are not limited to a specific segmentation algorithm for images.

The primary classification module 104 performs machine learning on a primary classifier using the plurality of segment images. In an embodiment, the primary classification module 104 may perform machine learning on the primary classifier by individually inputting the plurality of segment images into the primary classifier. That is, the disclosed embodiments are configured to segment an image into a plurality of segment images and perform individual learning on the segmented images through the primary classification module 104 to solve the classification problem on a high-resolution image.

In an embodiment, the primary classification module 104 is configured to perform training by inputting the segment images into the primary classifier in a supervised learning method. At this point, the classification value (label) of each of the plurality of segment images inputted into the primary classifier may be set to be equal to the classification value of the original learning image. That is, when original image X is divided into n segments (n is a natural number greater than or equal to 1) and it is assumed that the k-th segment image is $x_k$ ($1 \leq k \leq n$), the classification value of the original image is Y, the label of the k-th segment image is $y_k$, the classification function of the primary classifier to be learned is f, and a result estimated by the primary classifier for the k-th segment image is $\hat{y}_k$, the primary classification module 104 trains the primary classifier under the condition as shown below in Equation 1.

$$\text{Assuming } x = \overset{n}{\underset{k=1}{Y}} x_k \qquad \text{[Equation 1]}$$
$$\hat{y}_k = f(x_k), y_k = Y \text{ for } k = 1, 2, \ldots, n$$

Figure 2:
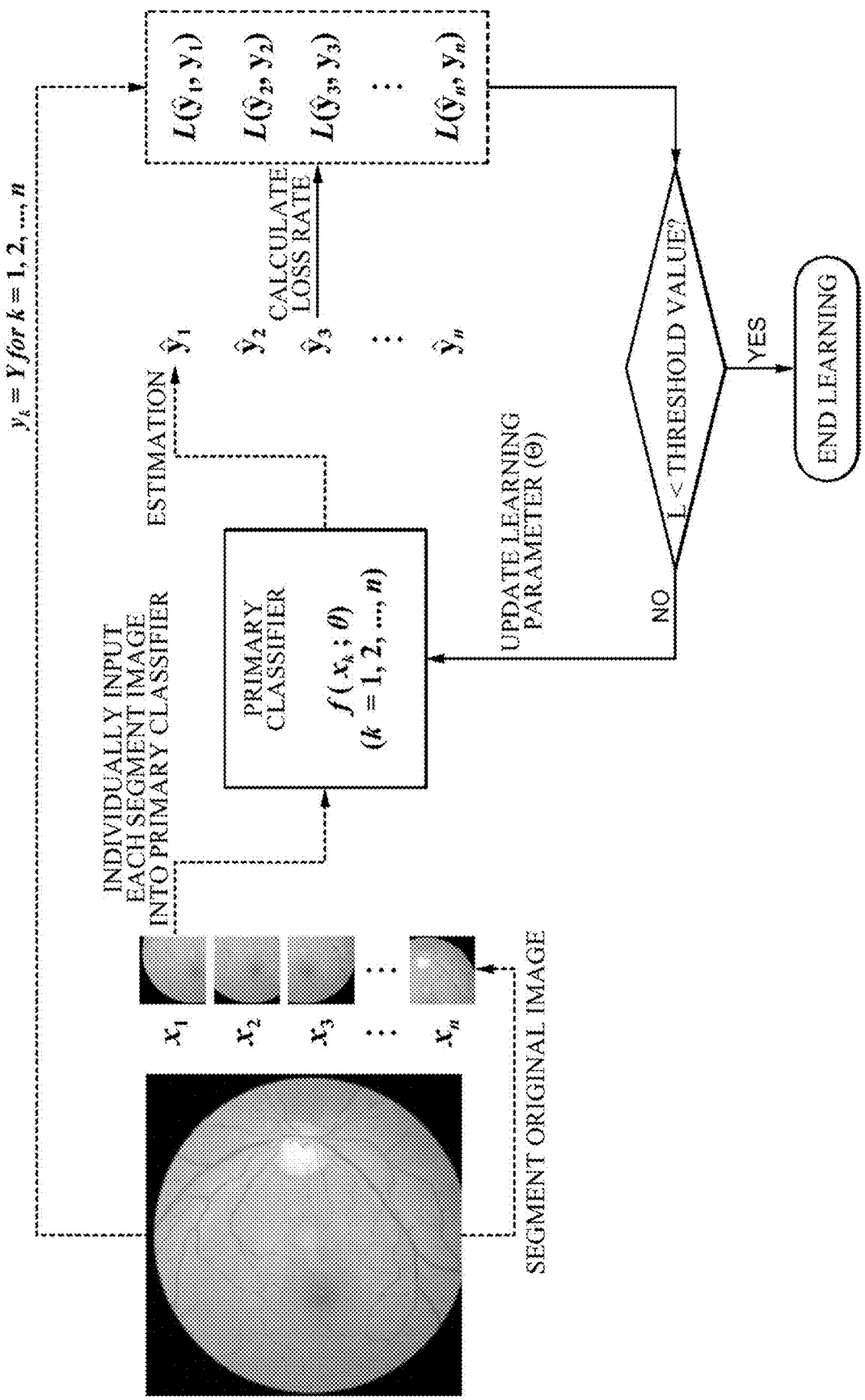
FIG. 2 is an exemplary view showing a primary classifier training procedure in a primary classification module 104 according to an embodiment.

FIG. 2 is an exemplary view showing a primary classifier training procedure in a primary classification module 104 according to an embodiment. As shown in the figure, when the image segmentation module 102 segments an inputted original learning image into a plurality of segment images, the primary classification module 104 inputs each segment image into the machine learning-based primary classifier and passes forward a result thereof to the secondary classification module 106. In an embodiment, a machine learning method based on diverse supervised learning including a deep convolutional neural network may be applied as an algorithm for the primary classifier.

The primary classifier receiving one of the segmented segment images $x_k$ creates a primary classification estimation value $\hat{y}_k$ of the segment image. When the classification function of the primary classifier is f, the classification function may be expressed as shown below in Equation 2.

$$f(x_k; \theta) \text{ for } k=(1,2,\ldots,n) \qquad \text{[Equation 2]}$$

The primary classification module 104 calculates a loss between the created primary classification estimation value and the classification value $y_k$ of the segment image. As described above, the classification value of each segment image may be set to be equal to the classification value of the original learning image ($y_k$=Y for k=1, 2, . . . , n). Accordingly, in this case, the loss may be calculated as shown below in Equation 3.

$$\text{loss}=L(\hat{y}_k,y_k) \quad \text{[Equation 3]}$$

Then, the primary classification module 104 determines whether the loss is smaller than a preset threshold value, and updates the learning parameter (θ) of the primary classifier when the loss is greater than or equal to the preset threshold value as a result of the determination.

Then, the secondary classification module 106 calculates a weight value combination for creating a classification estimation value of the learning image from a plurality of primary classification estimation values generated by passing the plurality of segment images to the trained primary classifier, or a machine learning-based learning parameter. That is, in the disclosed embodiment, classification of an input image is performed by connecting the primary classification module 104 and the secondary classification module 106 in series.

The secondary classification module 106 is trained using the estimation value (primary classification estimation value) of each segment image outputted from the trained primary classifier as an input. At this point, the primary classification estimation value $\hat{y}_k$ is a set of estimation values of each classification target class to be classified by the image classification apparatus 100, which may be any one among a regression value in the range of real number, a score value calculated in the form of probability between 0 and 1, and a result class value calculated in the form of an integer like 0 or 1, calculated by the primary classifier just before the final classification. In the present disclosure, the disclosed embodiment is configured to calculate the weight value combination or the learning parameter using any one among the three cases as an input of the secondary classifier training.

Figure 3:
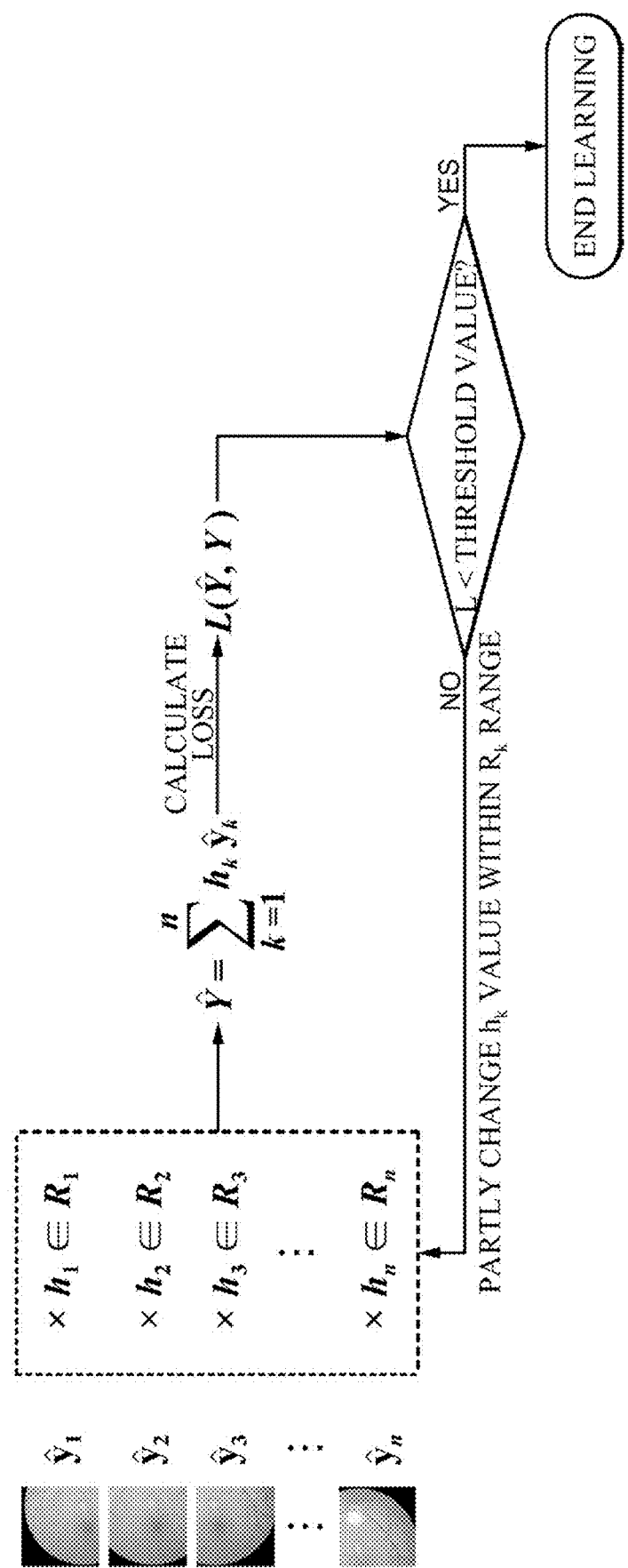
FIG. 3 is an exemplary view showing an optimum weight value combination search procedure in a secondary classification module 106 according to an embodiment.

FIG. 3 is an exemplary view showing an optimum weight value combination search procedure in a secondary classification module 106 according to an embodiment. In this embodiment, the secondary classification module 106 is trained to finally classify the input of the secondary classification module 106 by integrating the results of passing forward the segment images to the trained primary classifier using a weight value combination (a weighted composition or a weight value matrix) and is configured to enhance accuracy of the classification of the original image. If it is assumed that Ŷ is the final estimation result of the original image (secondary classification estimation value) and H=[$h_1$, $h_2$, . . . , $h_n$] is a weight value matrix used for calculating the secondary classification estimation value, the secondary classification estimation value may be calculated as shown below in Equation 4.

$$\hat{Y}=[h_1 h_2 \Lambda h_n][\hat{y}_1 \hat{y}_2 \Lambda \hat{y}_n]^T h_1 h_2 \Lambda h_n][f(x_1)f(x_2)\Lambda f(x_n)]^T \quad \text{[Equation 4]}$$

At this point, the weight value matrix H may be determined from a previously defined initial value in a grid search method within the search range $R_k$ of each previously defined weight value (weight value recombination method). Referring to FIG. 3, the secondary classification module 106 receives an initial weight value $h_k$ and a weight value search range $R_k$ for a plurality of primary classification estimation values $\hat{y}_k$ and first calculates a secondary classification estimation value by applying the initial weight value.

Then, the secondary classification module 106 calculates a loss between the calculated secondary classification estimation value Ŷ and the classification value Y of the original learning image. In this case, the loss may be calculated as shown below in Equation 5.

$$\text{loss}=L(\hat{Y},Y) \quad \text{[Equation 5]}$$

Then, the secondary classification module 106 determines whether the loss is smaller than the preset threshold value and repeatedly calculates the classification estimation value and the loss when the loss is greater than or equal to the threshold value as a result of the determination by changing some of the initial weight values included in the weight value matrix within the weight value search range. This process is repeatedly performed until the loss at normal times becomes smaller than the preset threshold value.

Figure 4:
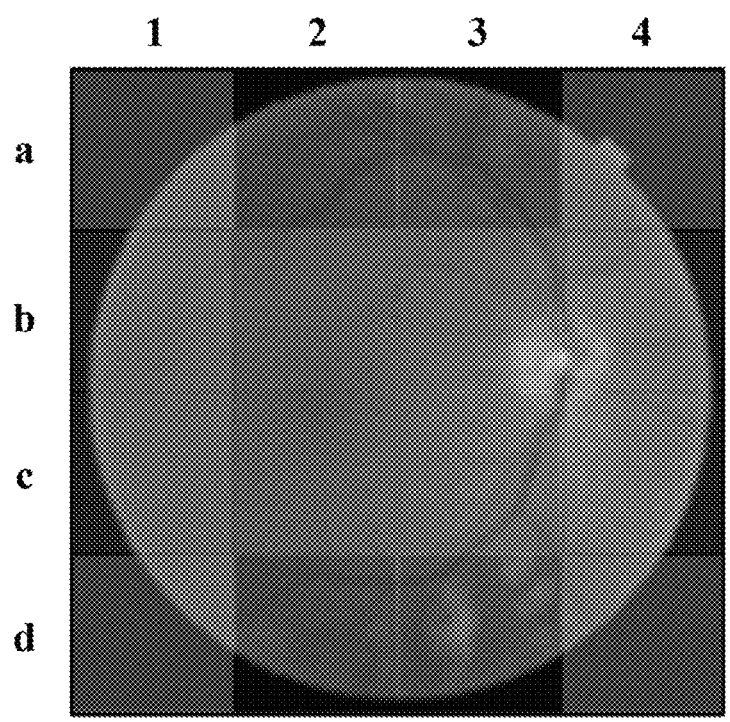
FIG. 4 is an exemplary view showing an example of searching for an optimum weight value combination through a weight value recombination method in an image classification apparatus 100 according to another embodiment.

FIG. 4 is an exemplary view showing an example of searching for an optimum weight value combination through a weight value recombination method in an image classification apparatus 100 according to another embodiment. When an original image is divided into sixteen areas and a plurality of segment images is created by combining 3×3 areas among the areas as shown in the figure, the weight values calculated for the segment images are as shown below in Table 1.

TABLE 1

| Segment name | Segment image configuration area | Weight value |
| --- | --- | --- |
| Original image | All areas | 0.05 |
| NW | 1a + 1b + 2a + 2b | 0.10 |
| NE | 3a + 3b + 4a + 4b | 0.05 |
| SW | 1c + 1d + 2c + 2d | 0.10 |
| SE | 3c + 3d + 4c + 4d | 0.05 |
| C | 2b + 2c + 3b + 3c | 0.15 |
| N | 2a + 2b + 3a + 3b | 0.05 |
| S | 2c + 2d + 3c + 3d | 0.05 |
| W | 1b + 1c + 2b + 2c | 0.20 |
| E | 3b + 3c + 4b + 4c | 0.20 |

Figure 5:
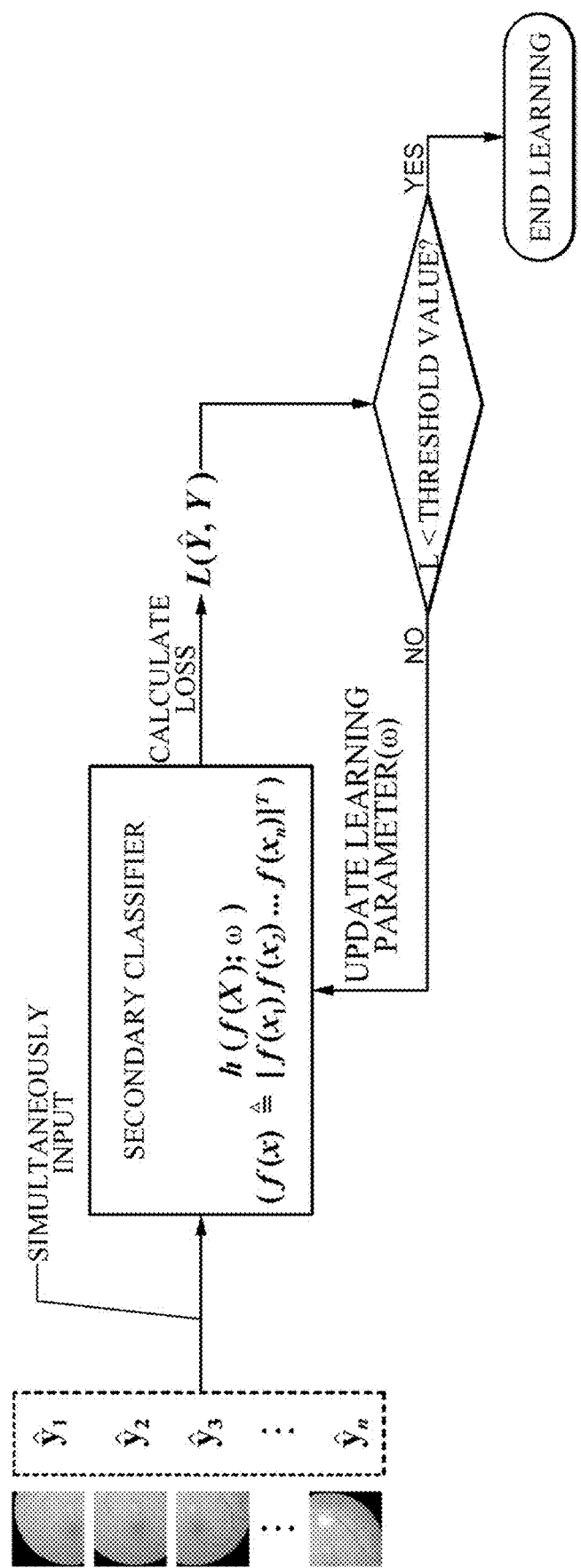
FIG. 5 an exemplary view showing an optimum weight value combination search procedure in a secondary classification module 106 according to another embodiment.

FIG. 5 an exemplary view showing an optimum weight value combination search procedure in a secondary classification module 106 according to another embodiment. In this embodiment, the secondary classification module 106 may be configured to perform machine learning on the secondary classifier by simultaneously inputting a result of forward passing the segment images to the trained primary classifier into the secondary classifier. If it is assumed that the final estimation result (secondary classification estimation value) of the original image is Ŷ and the classification function of the secondary classifier used for calculating the secondary classification estimation value is h, the secondary classification estimation value may be calculated as shown below in Equation 6.

$$\hat{Y}=h(\hat{y}_1,\hat{y}_2, \ldots ,\hat{y}_n;\omega)=h(f(x_1),f(x_2), \ldots f(x_n);\omega)$$

or $$\hat{Y}=h(f(X);\omega) \text{ given that } f(X) \triangleq [f(x_1)f(x_2) \ldots f(x_n)]^T \quad \text{[Equation 6]}$$

In an embodiment, the secondary classification module 106 may use logistic regression, a random forest based on decision tree, a neural network based on dense layer or the like as the secondary classifier.

Referring to FIG. 5, the secondary classification module 106 simultaneously inputs a plurality of primary classification estimation values $\hat{y}_k$ passing the segment images to the trained primary classifier into the secondary classifier.

Then, when the secondary classification estimation value Ŷ is calculated from the secondary classifier, the secondary classification module 106 calculates a loss between the calculated secondary classification estimation value $\hat{Y}$ and the classification value Y of the original learning image. In this case, the loss may be calculated as shown below in Equation 7.

$$\text{loss} = L(\hat{Y}, Y) \qquad \text{[Equation 7]}$$

Then, the secondary classification module 106 determines whether the loss is smaller than a preset threshold value, and updates the learning parameter ($\omega$) of the secondary classifier when the loss is greater than or equal to the preset threshold value as a result of the determination.

When training of the primary classification module 104 and the secondary classification module 106 is completed as described above, the image classification apparatus 100 may classify the inputted classification target image as described below.

First, the image segmentation module 102 segments an inputted original classification target image into a plurality of segment images. Then, the primary classification module 104 creates a primary classification estimation value $\hat{y}_k$ for each of the segmented segment images using the trained primary classifier. Finally, the secondary classification module 106 calculates a secondary classification estimation value $\hat{Y}$, which is the final classification value of the classification target image, by applying a previously calculated optimum weight value matrix to the primary classification estimation value $\hat{y}_k$ or using a secondary classifier based on machine learning.

Figure 6:
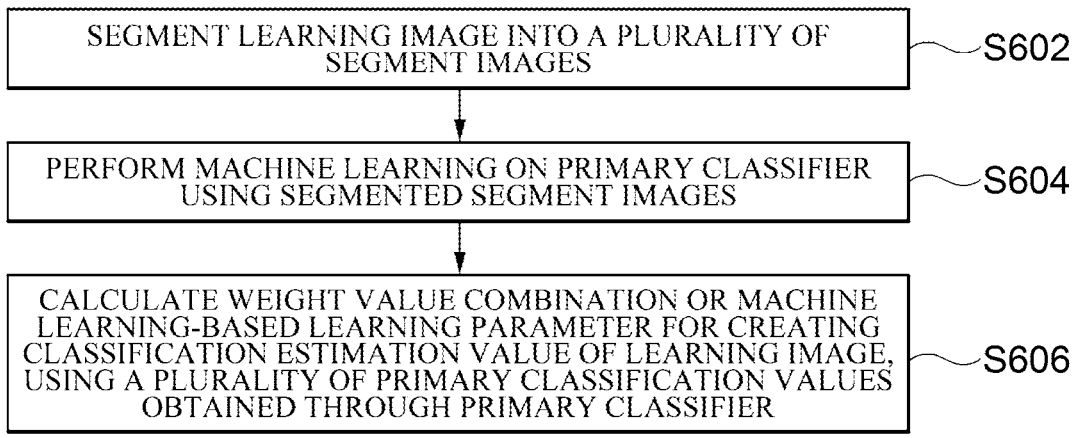
FIG. 6 is a flowchart illustrating an image classification method 600 according to an embodiment.

FIG. 6 is a flowchart illustrating an image classification method 600 according to an embodiment. The flowchart shown in the figure may be executed by a computing device including one or more processors and a memory for storing one or more programs executed by the one or more processors, for example, the image classification apparatus 100 described above. Although the method or the procedure is described as being divided in a plurality of steps in the flowchart shown in the figure, at least some of the steps may be performed in a different order or in combination and together with the other steps, omitted, divided into detailed steps, or performed in accompany with one or more steps not shown in the figure.

At step 602, the image segmentation module 102 segments an inputted original learning image into a plurality of segment images.

At step 604, the primary classification module 104 performs machine learning on the primary classifier using the plurality of segment images.

At step 606, the secondary classification module 106 calculates a weight value combination for creating a classification estimation value of the learning image from a plurality of primary classification estimation values generated by passing the plurality of segment images to the trained primary classifier, or a machine learning-based learning parameter.

Figure 7:
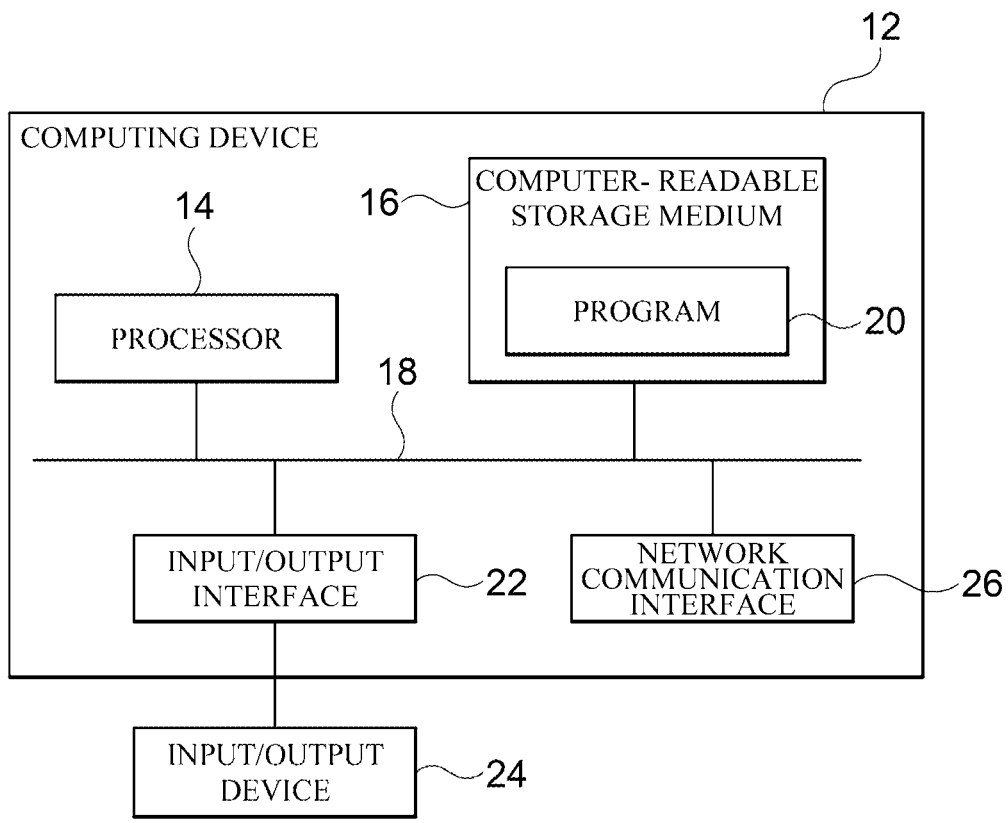
FIG. 7 is a block diagram showing an example of a computing environment 10 including a computing device appropriate to be used in exemplary embodiments.

FIG. 7 is a block diagram showing an example of a computing environment 10 including a computing device appropriate to be used in exemplary embodiments. In the embodiment shown in the figure, each of the components may have a different function and ability in addition to those described below and may include additional components other than those described below.

The computing environment 10 shown in the figure includes a computing device 12. In an embodiment, the computing device 12 may be the image classification apparatus 100 according to the embodiments of the present disclosure. The computing device 12 includes at least a processor 14, a computer-readable storage medium 16, and a communication bus 18. The processor 14 may have the computing device 12 operate according to the exemplary embodiments described above. For example, the processor 14 may execute one or more programs stored in the computer-readable storage medium 16. The one or more programs may include one or more computer executable commands, and the computer executable commands may be configured to have the computing device 12 perform operations according to the exemplary embodiment when the commands are executed by the processor 14.

The computer-readable storage medium 16 is configured to store computer-executable commands and program codes, program data and/or information of other appropriate forms. The programs 20 stored in the computer-readable storage medium 16 include a set of commands that can be executed by the processor 14. In an embodiment, the computer-readable storage medium 16 may be memory (volatile memory such as random access memory, non-volatile memory, or an appropriate combination of these), one or more magnetic disk storage devices, optical disk storage devices, flash memory devices, other forms of storage media that can be accessed by the computing device 12 and is capable of storing desired information, or an appropriate combination of these.

The communication bus 18 interconnects various different components of the computing device 12, including the processor 14 and the computer-readable storage medium 16.

The computing device 12 may also include one or more input and output interfaces 22 and one or more network communication interfaces 26, which provide an interface for one or more input and output devices 24. The input and output interfaces 22 and the network communication interfaces 26 are connected to the communication bus 18. The input and output devices 24 may be connected to other components of the computing device 12 through the input and output interfaces 22. Exemplary input and output devices 24 may include input devices such as a pointing device (a mouse, a track pad, etc.), a keyboard, a touch input device (a touch pad, a touch screen, etc.), a voice or sound input device, various kinds of sensor devices and/or photographing devices, and/or output devices such as a display device, a printer, a speaker and/or a network card. The exemplary input and output devices 24 may be included inside the computing device 12 as a component configuring the computing device 12 or may be connected to the computing device 12 as a separate apparatus distinguished from the computing device 12.

Meanwhile, the embodiments of the present disclosure may include programs for performing the methods described in this specification on a computer and computer-readable recording media including the programs. The computer-readable recording media may store program commands, local data files, local data structures and the like independently or in combination. The media may be specially designed and configured for the present disclosure or may be commonly used in the field of computer software. Examples of the computer-readable recording media include magnetic media such as a hard disk, a floppy disk and a magnetic tape, optical recording media such as CD-ROM and DVD, and hardware devices specially configured to store and execute program commands, such as ROM, RAM, flash memory and the like. An example of the program may include a high-level language code that can be executed by a computer using an interpreter or the like, as well as a machine code created by a compiler.

According to the disclosed embodiments, accuracy of classification may be enhanced in the machine learning-based image classification techniques using image segmentation.

Although representative embodiments of the present disclosure have been described above in detail, it should be understood that those skilled in the art may make diverse modifications on the embodiments described above without departing from the scope of the present disclosure. Therefore, the scope of the present disclosure should not be defined to be limited to the embodiments described above and should be defined by the claims described below and those equivalent to the claims.

What is claimed is:

1. An image classification apparatus comprising:
    an image segmentation module configured to segment a learning image into a plurality of segment images;
    a primary classification module configured to perform machine learning on a primary classifier using the plurality of segment images; and
    a secondary classification module configured to:
        calculate a weight value combination for creating a secondary classification estimation value for the learning image from a set of a plurality of primary classification estimation values generated by passing the plurality of segment images to the trained primary classifier, or a machine learning-based learning parameter; and
        search for an optimum weight value combination satisfying a preset condition while changing an initial weight value for the set of the plurality of primary classification estimation values within a weight value search range.

2. The apparatus according to claim 1, wherein the primary classification module is further configured to perform machine learning on the primary classifier by individually inputting the plurality of segment images into the primary classifier.

3. The apparatus according to claim 2, wherein a classification value of each of the plurality of segment images inputted into the primary classifier is set to be equal to a classification value of the learning image.

4. The apparatus according to claim 1, wherein the primary classification estimation value is any one among a regression value, a score value and a class value of each classification target class.

5. The apparatus according to claim 1, wherein the secondary classification module is further configured to receive the initial weight value and the weight value search range for each of the set of the plurality of primary classification estimation values.

6. The apparatus according to claim 5, wherein if a loss is smaller than a preset threshold value when a specific weight value combination is applied to the set of the plurality of primary classification estimation values, the secondary classification module is further configured to determine the specific weight value combination as the optimum weight value combination.

7. The apparatus according to claim 1, wherein the secondary classification module is further configured to perform machine learning on a secondary classifier by simultaneously inputting the set of the plurality of primary classification estimation values into the secondary classifier.

8. The apparatus according to claim 7, wherein the secondary classification module is further configured to update a learning parameter of the secondary classifier so that a loss of the secondary classification estimation value generated by the trained secondary classifier may be smaller than a preset threshold value.

9. An image classification method performed in a computing device including one or more processors and a memory for storing one or more programs executed by the one or more processors, the method comprising:
    a step of segmenting a learning image into a plurality of segment images;
    a primary learning step of performing machine learning on a primary classifier using the plurality of segment images; and
    a secondary learning step of calculating a weight value combination for creating a secondary classification estimation value for the learning image from a set of a plurality of primary classification estimation values generated by passing the plurality of segment images to the trained primary classifier, or a machine learning-based learning parameter,
    wherein the secondary learning step comprises:
    searching for an optimum weight value combination satisfying a preset condition while changing an initial weight value for the set of the plurality of primary classification estimation values within a weight value search range.

10. The method according to claim 9, wherein the primary learning step comprises:
    performing machine learning on the primary classifier by individually inputting the plurality of segment images into the primary classifier.

11. The method according to claim 10, wherein a classification value of each of the plurality of segment images inputted into the primary classifier is set to be equal to a classification value of the learning image.

12. The method according to claim 9, wherein the primary classification estimation value is any one among a regression value, a score value and a class value of each classification target class.

13. The method according to claim 9, wherein the secondary learning step comprises:
    receiving the initial weight value and the weight value search range for each of the set of the plurality of primary classification estimation values.

14. The method according to claim 13, wherein if a loss is smaller than a preset threshold value when a specific weight value combination is applied to the set of the plurality of primary classification estimation values, the secondary learning step further comprises:
    determining the specific weight value combination as the optimum weight value combination.

15. The method according to claim 9, wherein the secondary learning step comprises:
    performing machine learning on a secondary classifier by simultaneously inputting the set of the plurality of primary classification estimation values into the secondary classifier.

16. The method according to claim 15, wherein the secondary learning step further comprises:
    updating a learning parameter of the secondary classifier so that a loss of the secondary classification estimation value generated by the trained secondary classifier may be smaller than a preset threshold value.

* * * * *